United States Patent
Motoyama

(10) Patent No.: US 8,169,670 B2
(45) Date of Patent: May 1, 2012

(54) IMAGE SCANNING DEVICE

(75) Inventor: Toshiki Motoyama, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 517 days.

(21) Appl. No.: 12/475,076

(22) Filed: May 29, 2009

(65) Prior Publication Data

US 2009/0296167 A1 Dec. 3, 2009

(30) Foreign Application Priority Data

May 30, 2008 (JP) ................................. 2008-141860

(51) Int. Cl.
*H04N 1/04* (2006.01)
*H04N 1/46* (2006.01)
(52) U.S. Cl. .................... 358/474; 358/488; 358/505
(58) Field of Classification Search .................. None
See application file for complete search history.

(56) References Cited

FOREIGN PATENT DOCUMENTS

| JP | H05-268423 A | 10/1993 |
|---|---|---|
| JP | H08-032766 A | 2/1996 |
| JP | H11-231726 A | 8/1999 |
| JP | 2005-020270 A | 1/2005 |
| JP | 2006-020030 A | 1/2006 |

*Primary Examiner* — Thierry Pham
(74) *Attorney, Agent, or Firm* — Baker Botts L.L.P.

(57) ABSTRACT

In an image scanning device, the receiving unit receives a light reflected on a document putted on the surface of the board. The presuming unit presumes a dimension of a horizontal edge of the document based on the reflected light. The determining unit determines, based on the presumed dimension, whether or not the document has one of the plurality of standard sizes. The assuming unit assumes that the document has a virtual size defined by a virtual horizontal edge and a virtual longitudinal edge if the determining unit determines that the document has neither the plurality of standard sizes. The virtual horizontal dimension of the virtual horizontal edge is equal to or larger than the presumed dimension. The scanning unit scans the document over a range corresponding to the virtual size to generate image data.

11 Claims, 9 Drawing Sheets

FIG.4A

| WIDTH DIMENSION | DETECTION SIZE |
|---|---|
| WIDTH DIMENSION < 50mm | DETECTION FAILED |
| 50mm ≦ WIDTH DIMENSION < 69mm | B8 |
| 69mm ≦ WIDTH DIMENSION < 94mm | L-SIZE |
| 94mm ≦ WIDTH DIMENSION < 104mm | POSTCARD |
| 104mm ≦ WIDTH DIMENSION < 132mm | 2L |
| 132mm ≦ WIDTH DIMENSION < 153mm | A5 |
| 153mm ≦ WIDTH DIMENSION < 212mm | A4 |
| 212mm ≦ WIDTH DIMENSION < 214mm | VIRTUAL SIZE |
| 214mm ≦ WIDTH DIMENSION < 220.9mm | LETTER |
| 220.9mm ≦ WIDTH DIMENSION < 262mm | B4 |
| 262mm ≦ WIDTH DIMENSION < 284.4mm | LEDGER |
| WIDTH DIMENSION ≧ 284.4mm | A3 |

FIG.4B

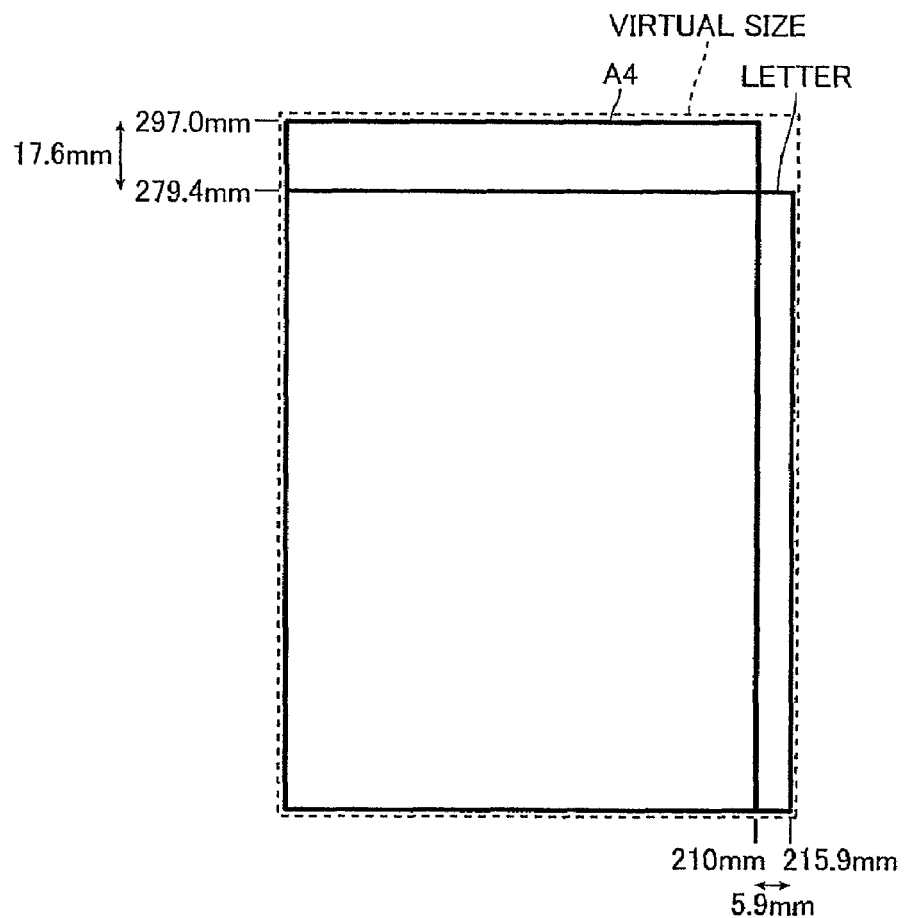

FIG.9A

| WIDTH DIMENSION | DETECTION SIZE |
|---|---|
| WIDTH DIMENSION < 50mm | DETECTION FAILED |
| 50mm ≦ WIDTH DIMENSION < 69mm | B8 |
| 69mm ≦ WIDTH DIMENSION < 94mm | L-SIZE |
| 94mm ≦ WIDTH DIMENSION < 104mm | POSTCARD |
| 104mm ≦ WIDTH DIMENSION < 132mm | 2L |
| 132mm ≦ WIDTH DIMENSION < 153mm | A5 |
| 153mm ≦ WIDTH DIMENSION < 213mm | A4 |
| 213mm ≦ WIDTH DIMENSION < 214mm | VIRTUAL SIZE |
| 214mm ≦ WIDTH DIMENSION < 220.9mm | LETTER |
| 220.9mm ≦ WIDTH DIMENSION < 262mm | B4 |
| 262mm ≦ WIDTH DIMENSION < 284.4mm | LEDGER |
| WIDTH DIMENSION ≧ 284.4mm | A3 |

FIG.9B

| WIDTH DIMENSION | DETECTION SIZE |
|---|---|
| WIDTH DIMENSION < 50mm | DETECTION FAILED |
| 50mm ≦ WIDTH DIMENSION < 69mm | B8 |
| 69mm ≦ WIDTH DIMENSION < 94mm | L-SIZE |
| 94mm ≦ WIDTH DIMENSION < 104mm | POSTCARD |
| 104mm ≦ WIDTH DIMENSION < 132mm | 2L |
| 132mm ≦ WIDTH DIMENSION < 153mm | A5 |
| 153mm ≦ WIDTH DIMENSION < 212mm | A4 |
| 212mm ≦ WIDTH DIMENSION < 213mm | VIRTUAL SIZE |
| 213mm ≦ WIDTH DIMENSION < 220.9mm | LETTER |
| 220.9mm ≦ WIDTH DIMENSION < 262mm | B4 |
| 262mm ≦ WIDTH DIMENSION < 284.4mm | LEDGER |
| WIDTH DIMENSION ≧ 284.4mm | A3 |

IMAGE SCANNING DEVICE

CROSS REFERENCE TO RELATED APPLICATION

This application claims priority from Japanese Patent Application No. 2008-141860 filed May 30, 2008. The entire content of the priority application is incorporated herein by reference.

TECHNICAL FIELD

The present invention relates to an image scanning device.

BACKGROUND

A conventional document scanning and recording device, such as a copier, can automatically determine size of a document placed on a platen. To this effect, laid-open Japanese patent application publication No. 11-231726 discloses that, width of the document is first detected and the size of the document is subsequently determined based on the detected width of the document.

FIG. 1A is a schematic diagram showing an A4 size document placed on a platen of a conventional copier. As shown in FIG. 1A, the conventional copier pre-scans a portion of the document and calculates a width dimension (width of short side) of the document. Given the fact that an A4 size sheet has the width dimension of 210 mm, the copier can determine whether or not the document on the platen is A4-sized based on the measured width dimension.

SUMMARY

However, such a conventional copier sometimes fails to determine a size of a document accurately especially when the document is either A4 size or letter size.

FIG. 1B shows a difference in size between an A4 size sheet and a letter size sheet. The dimensional difference with respect to the short sides between the A4 size and the letter size is very small, as shown in FIG. 1B. Hence, a small error in detecting the width dimension of the A4 size document could sometimes lead to wrong detection, resulting in a wrong determination that the size of the document is the letter size.

On the other hand, as shown in FIG. 1B, the longitudinal dimension of the letter size sheet is smaller than that of the A4 size sheet. Therefore, if the conventional copier erroneously detects an A4 size sheet as a letter size sheet and sets a scanning region to be of the letter size, information contained in a portion of the A4 size sheet in the longitudinal direction may not be covered by the scanning region, thereby leading to a loss of the information included in the portion.

The above-mentioned JP11-231726 also discloses a technique that, if a document size cannot be detected, the scanning region is automatically set to be adapted to a size of recording sheets accommodated in the copier. However, since the size of the document placed on the platen does not necessarily correspond to the size of the recording sheet size accommodated in the copier, it is still impossible to determine the size of the document placed on the platen accurately.

In view of the foregoing, it is an object of the present invention to provide an image scanning device capable of scanning a document without a loss of information.

In order to attain the above and other objects, the present invention provides an image scanning device including a board, a receiving unit, a presuming unit, a determining unit, an assuming unit, and a scanning unit. The board has a surface on which a document having a rectangular shape is puttable. The surface has an X-axis extending in an X-direction and a Y-axis extending in a Y-direction orthogonal to the X-direction. The document includes a standard document having a plurality of standard sizes different from one another and each defined by a horizontal edge and a longitudinal edge orthogonal to the horizontal edge. The receiving unit receives a light reflected on the document putted on the surface. The presuming unit presumes a dimension of the horizontal edge of the document putted on the surface, based on the reflected light. The determining unit determines, based on the presumed dimension, whether or not the document putted on the surface has one of the plurality of standard sizes. The assuming unit assumes that the document putted on the surface has a virtual size defined by a virtual horizontal edge and a virtual longitudinal edge orthogonal to the virtual horizontal edge if the determining unit determines that the document putted on the surface has neither the plurality of standard sizes. The virtual horizontal edge has a virtual horizontal dimension equal to or larger than the presumed dimension if the horizontal edge and the virtual horizontal edge extend in the X-direction. The virtual longitudinal edge has a virtual longitudinal dimension. The scanning unit scans the document over a range corresponding to the virtual size to generate image data, if the assuming unit assumes that the document putted on the surface has the virtual size.

Another aspect of the present invention provides a computer-readable storage medium storing a set of program instructions executable on an image scanning device including a board having a surface on which a document having a rectangular shape is puttable, the surface having an X-axis extending in an X-direction and a Y-axis extending in a Y-direction orthogonal to the X-direction, the document including a standard document having a plurality of standard sizes different from one another and each defined by a horizontal edge and a longitudinal edge orthogonal to the horizontal edge; a receiving unit that receives a light reflected on the document putted on the surface; and a scanning unit that scans the document to generate image data. The program instructions includes: presuming a dimension of the horizontal edge of the document putted on the surface, based on the reflected light; determining, based on the presumed dimension, whether or not the document putted on the surface has one of the plurality of standard sizes; assuming that the document putted on the surface has a virtual size defined by a virtual horizontal edge and a virtual longitudinal edge orthogonal to the virtual horizontal edge if the determining unit determines that the document putted on the surface has neither the plurality of standard sizes, the virtual horizontal edge having a virtual horizontal dimension equal to or larger than the presumed dimension if the horizontal edge and the virtual horizontal edge extend in the X-direction, the virtual longitudinal edge having a virtual longitudinal dimension; and controlling the scanning unit to scan the document over a range corresponding to the virtual size, if the assuming unit assumes that the document putted on the surface has the virtual size.

BRIEF DESCRIPTION OF THE DRAWINGS

The particular features and advantages of the invention as well as other objects will become apparent from the following description taken in connection with the accompanying drawings, in which:

FIG. 4A is a schematic diagram showing a configuration of a document size determination table;

FIG. 4B is a diagram showing a relationship among an A4 size, a letter size and a virtual size;

FIGS. 9A and 9B are diagrams showing configurations of a document size determination table according to variations of the present invention.

DETAILED DESCRIPTION

A preferred embodiment of the present invention will be described will be described hereinafter with reference to FIGS. 2A through 8.

Figure 1A:
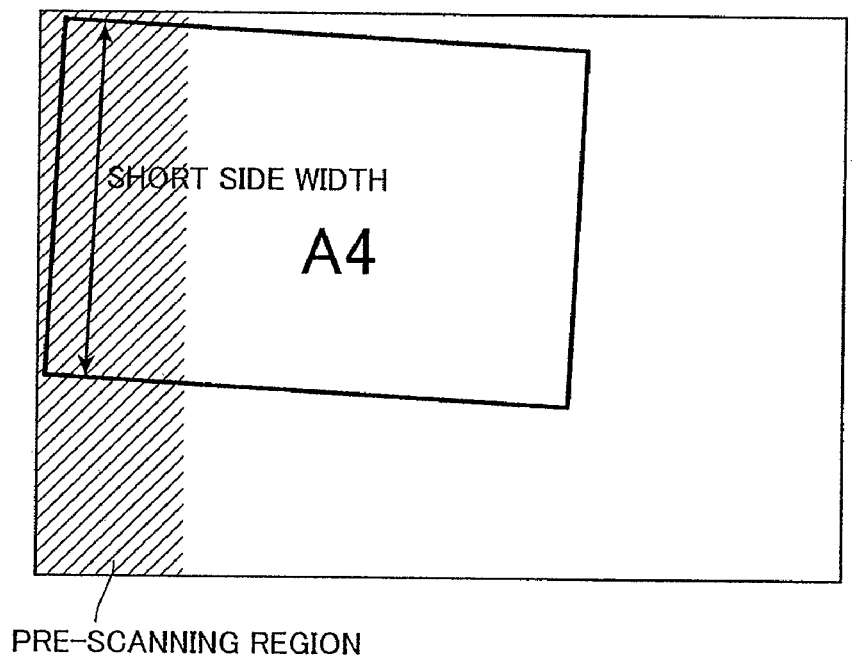
FIG. 1A is a diagram showing an A4 size document placed on a platen of a scanner of a conventional copier.
Figure 1B:
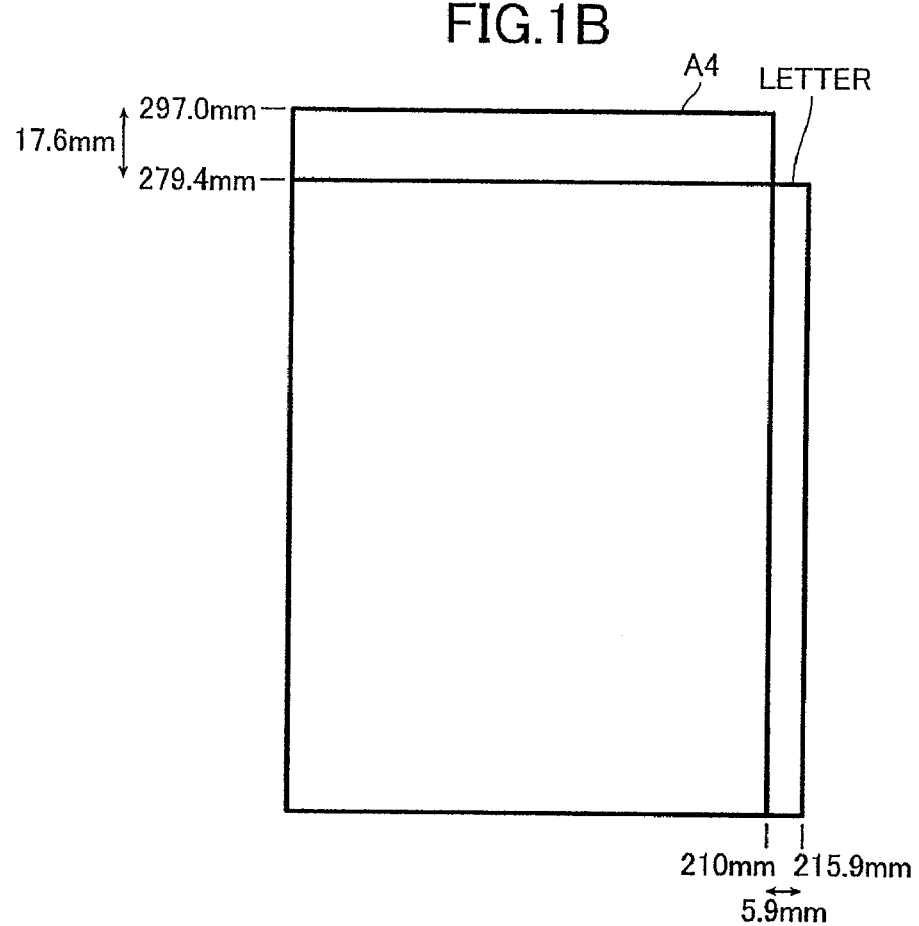
FIG. 1B is a view showing differences in size between the A4 size and the letter size sheets.
Figure 2A:
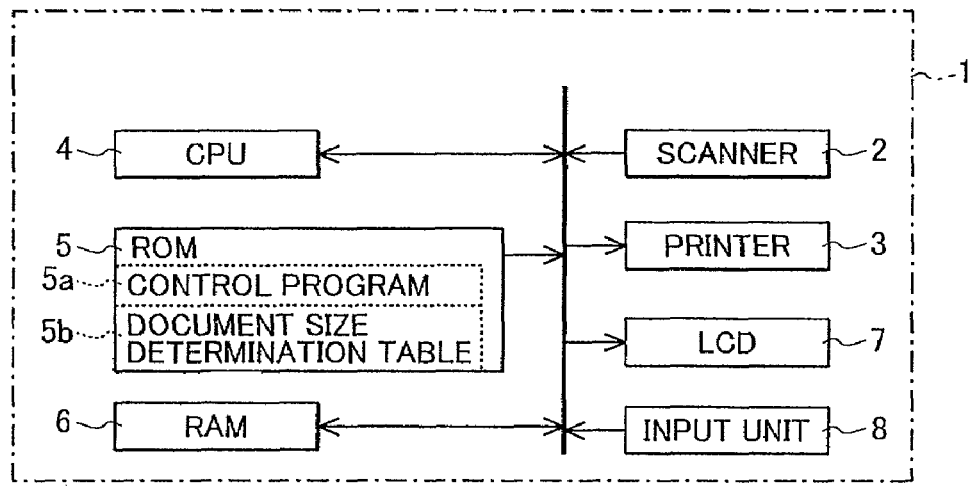
FIG. 2A is an explanatory view showing a configuration of a digital multifunctional device according to an embodiment of the present invention.
Figure 2B:
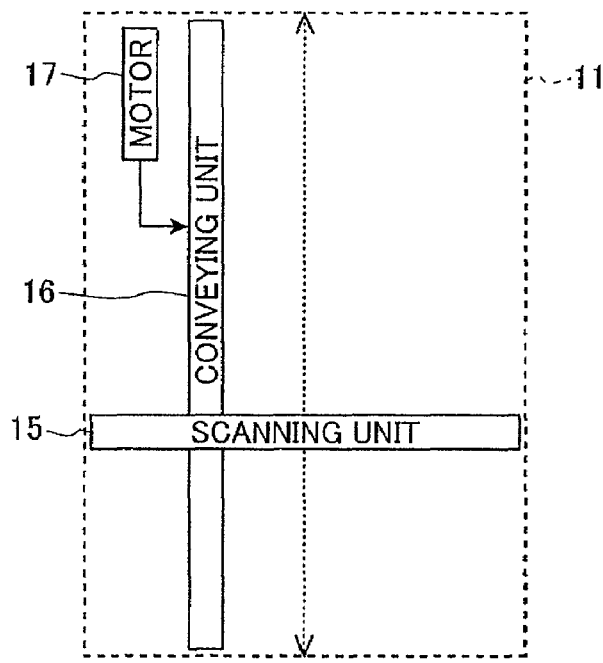
FIGS. 2B and 2C are explanatory views showing a configuration of a scanner.
Figure 2C:
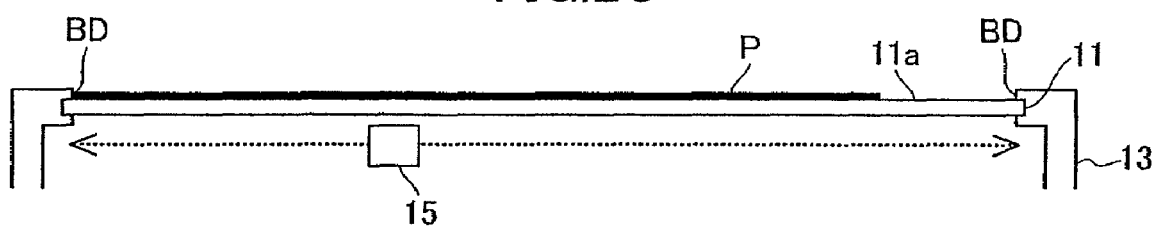

As shown in FIG. 2A, the digital multifunctional device 1 according to the present embodiment (hereinafter referred to as MFP 1) includes a scanner 2, a printer 3, a CPU 4, a ROM 5, a RAM 6, an LCD 7 and an input unit 8. The CPU 4 controls over the entire device by executing various processing based on a control program 5a stored in the ROM 5.

The scanner 2 includes a transparent platen glass 11, a housing 13, a scanning unit 15, a conveying unit 16, and a motor 17. The transparent platen glass 11 is supported to the housing 13 and a document P to be scanned is placed on the transparent platen glass 11. The scanning unit 15 is provided under the platen glass 11 within the housing 13 to optically scan an image though the platen glass 11 in a main scanning direction. The motor 17 drives the conveying unit 16 to convey the scanning unit 15 in a sub scanning direction (a dotted arrow in FIGS. 2B and 2C) perpendicular to the main scanning direction.

As the motor 17 rotates, the conveying unit 16 is driven to convey the scanning unit 15 in the sub scanning direction under the platen glass 11. While being conveyed, the scanning unit 15 executes scanning operations.

The scanning unit 15 is disposed along the main scanning direction and is configured of a contact image sensor (CIS) and a plurality of light emitting members. The plurality of light emitting members irradiates the document P placed on the platen glass 11, and the CIS receives the light reflected by the surface of the document P. Thus, the scanning unit 15 scans image through the platen glass 11 line by line while moving in the sub scanning direction, and outputs a line image signal that indicates the scanned image. At this time, the line image signal outputted from the scanning unit 15 is converted into digital data (image data) by an A/D converter (not shown).

The scanner 2 is provided with a cover (not shown) so that the platen glass 11 can be covered or exposed by the cover.

While the scanning unit 15 is executing scanning operations, a user can manually close the cover over the document placed on the platen glass 11. Note that the cover has an inner side surface configured of a white-colored member so that image of the cover itself cannot be appeared in the scanned image of the document.

In accordance with commands from the CPU 4, the scanner 2 executes scanning operations. The scanner 2 thus controls movements of the scanning unit 15 in the sub scanning direction as well as scanning operations of the scanning unit 15. In other words, the CPU 4 controls the scanner 2 to scan images falling into the designated scanning area of the platen glass 11, to convert the same into image data, and also to store the same in the RAM 6 while controlling the scanning unit 15 to move in the sub scanning direction under the platen glass 11. In this way, the RAM 6 stores image data expressing the image of the scanned surface of the document P placed on the scanning area of the platen glass 11.

The printer 3 conveys recoding sheets accommodated in a tray (not shown) to a recording position, and prints image data designated by the CPU 4 on the conveyed recoding sheets.

The LCD 7 includes a liquid crystal display (not shown) for displaying information and is configured to display information for a user in accordance with a command from the CPU 4. The input unit 8 includes various operation keys through which a user inputs commands. The input unit 8 inputs the commands from the user to the CPU 4.

The CPU 4 executes programs based on the commands inputted through the operation keys or commands inputted from an external computer or the like via an interface (not shown) so that the MFP 1 can perform copying, faxing, scanning or printing operations.

For example, the MFP1 can perform automatic magnifying copy process when instructed by the CPU 4. More specifically, in the present embodiment, upon receiving a command from a user to execute the automatic magnifying copy process, the MFP1 1 pre-scans a part of the document P placed on the platen glass 11, and determines size of the document P (hereinafter referred to as document size). The MFP1 then determines a magnifying ratio from the determined document size and the size of the recoding sheets, magnifies or reduces the scanned image of the document P based on the magnifying ratio so that the scanned image can fit in the recording sheets, and finally prints the scanned image. Details of the auto magnifying copy process will be described later.

Detailed configuration of the scanner 2 according to the present embodiment will be described next with reference to FIGS. 3A and 3B.

In the MFP 1, the housing 13 has a rectangular parallelepiped shape having an open upper surface. The platen glass 11 that is a rectangular-shaped plate glass is provided in the housing 13 so that the opened surface of the housing 13 can be covered by the platen glass 11. That is, the platen glass 11 is surrounded and supported by the housing 13.

Figure 3A:
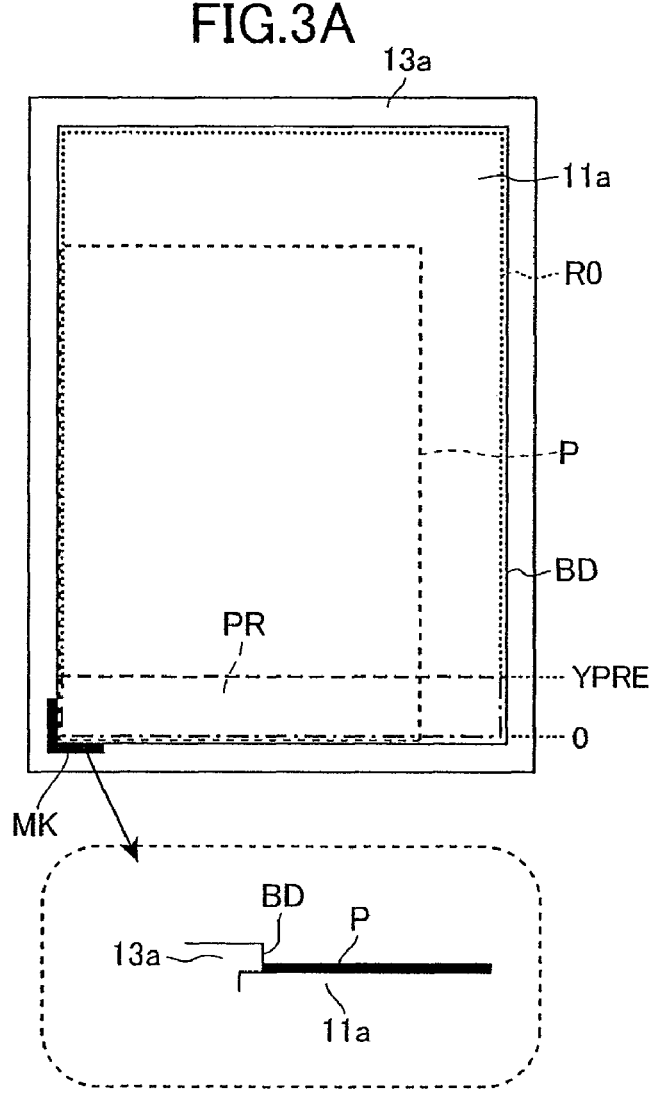
FIG. 3A is an explanatory view showing a scannable region of a platen glass.

As shown in FIG. 3A, the platen glass 11 is disposed at a level slightly lower than the upper surface of the housing 13. A bump is therefore formed on a boundary between the housing 13 and an area 11a of the platen glass 11 exposed from the housing 13 (hereinafter referred to as platen 11a). The bump serves for positioning the document P on the platen. A portion of the upper surface of the housing 13 disposed at a level higher than the platen glass 11, i.e., a portion constituting the bump, is called a frame 13a.

In the scanner 2, a rectangular scannable region R0 shown in FIG. 3A is a region within which the scanning unit 15 can scan a document. The scannable region R0 is determined, based on the width of the scanning unit 15 relative to the size of the platen 11a, such that the scannable region R0 is slightly smaller than the entire rectangular area constituting the platen 11a. More specifically, as shown by a dotted line in FIG. 3A, the scannable region R0 is a region whose circumference is retracted from the boundary BD by a marginal amount (in this embodiment, the margin is set to be 3 mm).

A marking MK is formed on the lower-left corner of the frame 13a. Note that in the present embodiment, a corner of the platen 11a at which the marking MK is shown will be referred to as a "lower-left corner", while another corner of the platen 11a located at a point separated from the lower-left corner in the main scanning direction will be referred to as a "lower-right corner".

In the MFP 1, the lower-left corner of the platen 11a (i.e., inner lower-left corner of the frame 13a) is designated as a place at which the document P should be placed. The MFP 1 determines a document size and makes duplicates, assuming that the document P is placed on the platen 11a with the lower-left corner of the document P aligned with the marking MK.

Figure 3B:
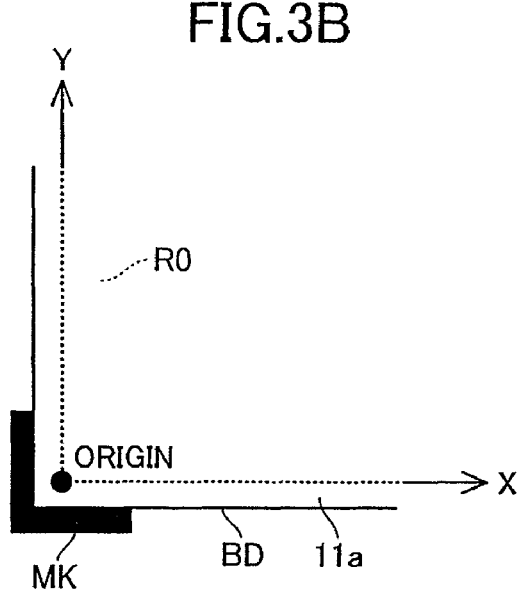
FIG. 3B is an XY coordinate system explaining the scannable region.
Figure 5:
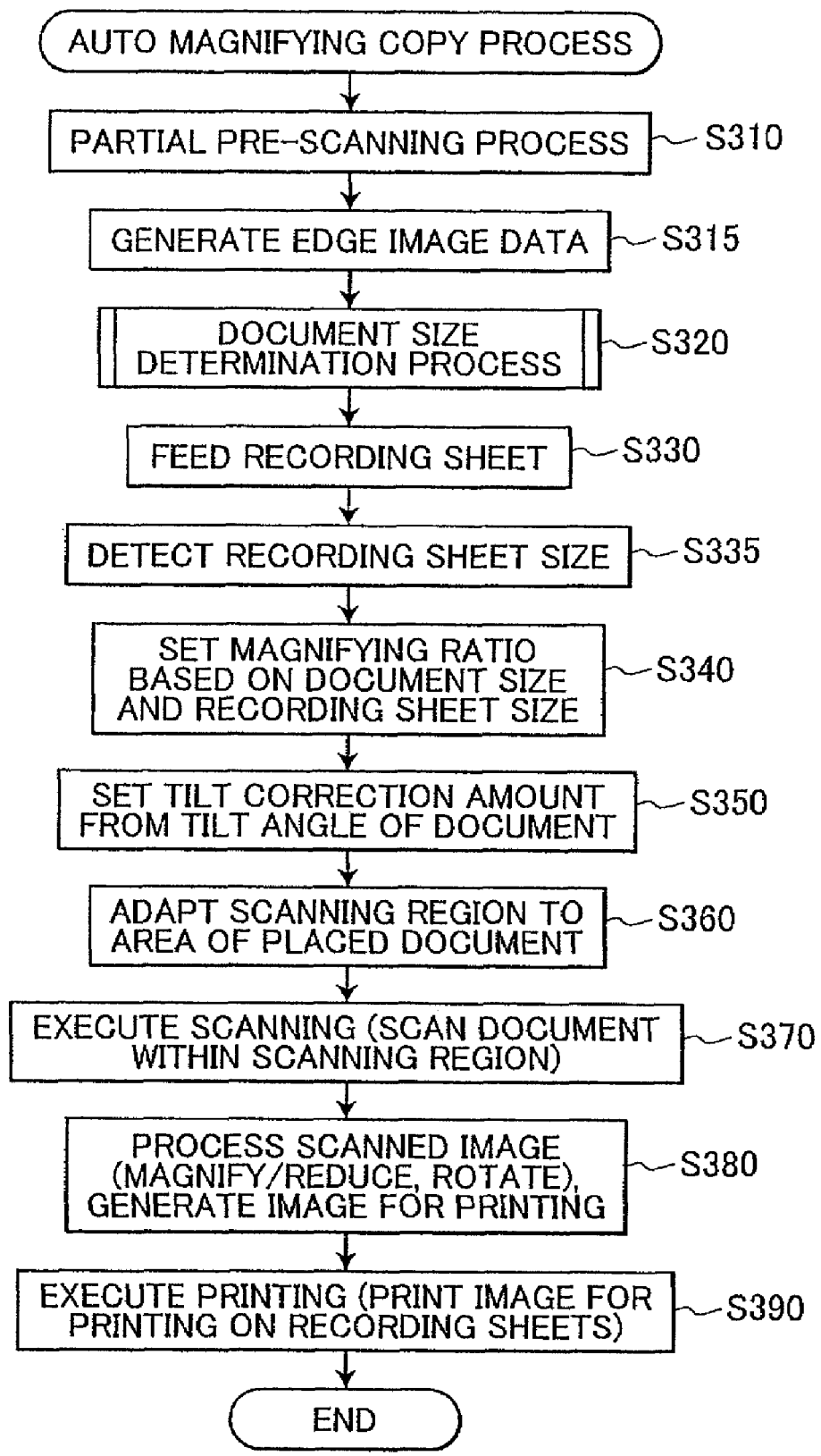
FIG. 5 is a flowchart showing an automatic magnifying copy process.

The MFP 1 additionally employs an XY coordinate system as shown in FIG. 3B. In the XY coordinate system, the lower-left corner of the scannable region R0, which corresponds to the inner lower-left corner of the frame 13a provided with the marking MK, is designated as an origin, the main scanning direction as an X-axis, and the sub scanning direction as a Y-axis. The CPU 4 executes the auto magnifying copy process using the XY coordinate system, as shown in FIG. 5.

As will be described later, in the auto magnifying copy process of the present embodiment, the MFP 1 pre-scans a belt-like region PR which is prescribed as a range from 0 to YPRE in the Y-axis in the scannable region R0. Based on the pre-scanned result, the MFP 1 then detects edges of the document P placed on the platen 11a in the main scanning direction (X-axis), and estimates the lower-left corner and the lower-right corner of the placed document P from the detected edges. Finally, the MFP 1 presumes the width dimension of the document P to be the dimension of the segment connecting the lower-left corner and the lower-right corner of the document P.

Hence, when the document P is placed on the platen 11a in portrait orientation, i.e., when the shorter side of the document P is aligned with the main scanning direction, the dimension of the shorter side is presumed to be the width dimension of the document P. Likewise, when the document P is placed on the platen 11a in landscape orientation, i.e., the long side of the document P is aligned with the main scanning direction, the dimension of the long side is presumed to be the width dimension of the document P. However, in the present invention, the document P is assumed to be placed in portrait orientation in order to facilitate understanding of the present invention. That is, the short side of the document P is presumed to be the width dimension of the document P.

Also in the present embodiment, the document P is assumed to be a standard size recording sheet, such as a postcard size, an A4 size, an A3 size or a letter size. Under the assumption that the document P has a standard size, the MFP 1 can determines the document size of the document based on the estimated width dimension of the document P and a document size determination table 5b, since a standard size recording sheet has fixed dimensions in both short and long sides.

The document size determination table 5b, as conceptually shown in FIG. 4A, is stored in the ROM 5. The document size determination table 5b is used for determining the document size of the document from the detected width dimension. The document size determination table 5b stores a plurality of standard sizes of recording sheets that the MFP 1 can scan (B8 size, L size, postcard size, for example) and respective numeric ranges of width dimension that fall into corresponding standard sizes. For instance, the document size determination table 5b stores a numeric range "greater than or equal to 153 mm, but smaller than 212 mm" for the A4 size so that the width dimension of the regular A4 size sheet (210 mm) can be included therein. Likewise, for the letter size, a numeric range "more than or equal to 214 mm, but smaller than 220.9 mm" is stored so that the width dimension of the letter size sheet (215.9 mm) can be covered.

Note that, the document size determination table 5b shown in FIG. 4A is elaborated based on an assumption that the document P is placed on the platen 11a in portrait orientation, and therefore, each dimension prescribed in the document size determination table 5b is based on the dimension of short side of each standard size recording sheet. In the following description of the present embodiment, unless otherwise stated, dimension of a short side in a standard size sheet is designated as the "width dimension", while dimension of a long side is designated as the "length dimension".

The MFP 1 estimates the width dimension of the document P from the positions of the edges detected at the pre-scanning, and determines the document size based on which range the detected width dimension of the document P falls into. For example, if the detected width dimension falls into the range corresponding to the A4 size, the MFP 1 determines the document size of the document P to be A4 size. Similarly, if the estimated width dimension is within the range corresponding to the letter size, the document size is determined to be the letter size. In this way, the MFP 1 can determine which of standard size sheets the document P corresponds to, based on the measured width dimension of the document P. Alternatively, even if a detected width dimension of the document P does not indeed indicate accurate width dimension of the actual document size of the document P, the MFP 1 can still determine the document size correctly from the detected width dimension, as long as the discrepancy is included in the numeric range of the correct document size.

However, differences in width dimension between the A4 size and the letter size are quite small (5.9 mmm difference in short side; 17.6 mm difference in long side), as shown in FIG. 4B. Therefore, detection of the A4 size and letter size may sometimes result in an erroneous determination.

To this effect, in the MFP 1 of the present embodiment, the document size determination table 5b further includes a prescribed virtual size, which is adapted to be applicable to both of the A4 size and the letter size. When determining whether the document size is either the A4 size or the letter size is difficult, the document size is determined to be the virtual size in the present embodiment. More specifically, when the detected width dimension is larger than the maximum value in the numeric range of the A4 size and smaller than the minimum value in the numeric range of the letter size, i.e., greater than or equal to 212 mm and smaller than 214 mm, the MFP 1 determines the document size to be the virtual size.

As shown in FIG. 4B, the virtual size has a width dimension corresponding to the letter size and a length dimension corresponding to the A4 size. Note that, the width dimension of the letter size (dimension of the short side in the present embodiment) is greater than that of the A4 size, while the length dimension of the A4 size (dimension of the long side in the present embodiment) is greater than that of the letter size. That is, the virtual size is designed to include both the A4 size and the letter size.

According to the present embodiment, the MFP 1 determines a document size to be the above-defined virtual size if measured width dimension of a document meets a prescribed condition, i.e., if the measured width dimension falls into the numeric range corresponding to the virtual size in the document size determination table 5*b*.

For example, when an A4 size document is placed on the platen 11*a* but a lower-left corner of the document is not properly aligned with the lower-left corner of the platen 11*a*, the width dimension of the placed A4 document may be presumed to be greater than 210 mmm (the actual width dimension of the A4 size). In this case, the MFP 1 determines the document size to be the virtual size. Since the virtual size has the width dimension of the letter size (215.9 mm) and the length dimension of the A4 size (297.0 mm), the dimensions of the actual A4 size is covered by the virtual size both in short side and long side. Or alternatively, when a letter size document is placed on the platen 11*a*, the virtual size can still include the actual document of the letter size both in width and length.

In this way, the MFP 1 can determine a suitable document size (i.e., virtual size) capable of including width and length dimensions of an actual document, regardless of the actual document being A4 size or letter size. Therefore, the MFP 1 can scan the document without loss of information.

Note that, the present embodiment employs the virtual size with the letter size width dimension and the A4 size length dimension. However, the width dimension width and the length dimension for the virtual size are not limited to those of the above-described embodiment. For example, the width dimension of the virtual size may be set to be slightly greater than that of the letter size, or the length dimension may be set to be slightly greater than that of the A4 size.

However, it is preferable that the virtual size has smaller dimensions in width and length than other standard sizes whose width and length dimensions are greater than the A4 size and the letter size (such as B4 size, Ledger size, and A3 size). Having such dimensions, the MFP 1 can determine a suitable document size which is not too large for an actual document.

Next, the auto magnifying copy process executed by the CPU 4 will be described with reference to FIGS. 5 through 8. In the auto magnifying copy process, the CPU 4 executes pre-scanning operations and determines a document size and a magnifying ratio based on data obtained in the pre-scanning operations. The CPU 4 then instructs the scanner 2 to perform full-scanning operations, magnifies or reduces scanned image data, and controls the printer 3 to print the image on recording sheets at a scale corresponding to the recording sheets.

As shown in FIG. 5, the CPU 4 first sets up a pre-scanning region PR (see FIG. 3A) by defining a lower end as a scan starting point (Y=0) and a position away from the lower end by a predetermined distance in the sub scanning direction as a scan ending point (Y=YPRE). The CPU 4 then executes a partial pre-scanning process at S310, whereby the scanner 5 scans the pre-scanning region PR. The pre-scanned image data (pre-scan result) is stored in the RAM 6.

At S315, the CPU 4 then executes an edge data generation process for the pre-scanned image data stored in the RAM 6, thereby generating edge image data corresponding to the image data. That is, the CPU 4 converts the pre-scanned image data into the edge image data through an image filter for edge detection (i.e., a conventional differential filter).

Then, at S320, the CPU executes a document size determination process (will be described later with reference to FIG. 6) for the edge image data generated at S315. In the document size determination process, the CPU 4 analyzes the edge image data, and determines the size of the document placed on the platen 11*a*, a tilt angle θ of the document for Y-axis, and an area which the document placed on the platen 11*a* covers (area of the placed document).

Once determining the document size, the CPU 4 controls the printer 3 to feed recording sheet at S330 and receives information of a size of the recording sheet that is inputted by a user, at 335. Subsequently, the CPU 4 calculates and sets a magnifying ratio at S340 based on the document size determined at S320 and the size of the recording sheets detected at S335. The magnifying ratio is calculated so as to be in proportion to a ratio between the document size and the size of recording sheets, using a predetermined expression (short side length of the recording sheet/width dimension of the document size, for example). In this way, copied image of the document is magnified at the magnifying ratio corresponding to the ratio of the document size relative to the size of the recording sheets, or reduced when the magnifying ratio is smaller than one, and then printed on the recording sheets in the subsequent steps.

The CPU 4 then determines a tilt modification amount at S350 from a tilt angle θ obtained at S320. The tilt modification amount is determined such that the copied image of the document can be printed straight on the recording sheets without being slanted.

At S360, the CPU 4 determines a scanning region based on the area of the placed document determined at S320. More specifically, the CPU 4 determines a scan starting point at a position corresponding to an upstream end of the area of the placed document and a scan ending point at a position corresponding to a downstream end of the area of the placed document in the sub scanning direction. Hence, the scanning region is adapted to cover the whole area of the document placed on the platen 11*a*.

Then at S370, the CPU 4 controls the scanner 2 to convey the scanning unit 15 from the scan starting point to the scan ending point in the sub scanning direction. While being conveyed, the scanning unit 15 executes the full-scanning operation line by line, reads image data corresponding to the scanned surface of the document, and stores the image data in the RAM 6.

Subsequently, the CPU 4 magnifies or reduces the image data stored in the RAM 6 at the magnifying ratio set at S340, and rotates the same by the tilt modification amount determined at S350 if necessary. The CPU 4 then converts the image data indicating the image data read at S370 into image data for printing, and designates the converted image data as image data to be printed (S380).

The CPU 4 then executes printing operations for the designated image data at S390. That is, the CPU 4 orders the printer 3 to print images based on the designated image data on the supplied recording sheets. The CPU 4 then finally terminates the auto magnifying copy process.

As described above, a copied image of the document is printed on recording sheets at a size in proportion to the size of the recording sheets in the auto magnifying copy process.

Figure 6:
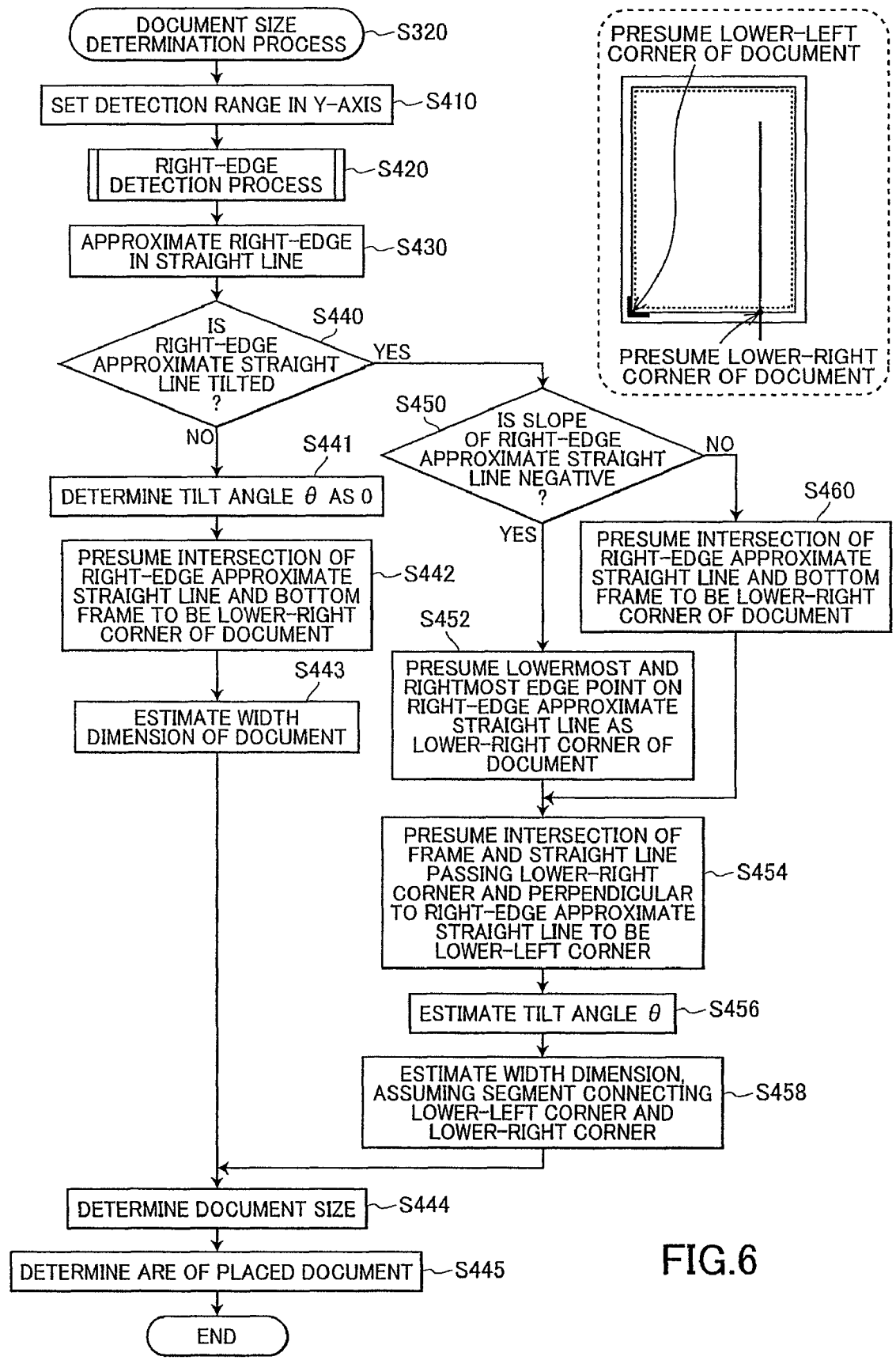
FIG. 6 is a flowchart showing a document size determination process.

Next, the document size determination process executed by the CPU 4 at S320 in the auto magnifying copy process will be described with reference to FIG. 6. FIG. 6 is a flowchart showing the document size determination process executed by the CPU 4.

First, at S410, the CPU 4 sets up a detection range in the Y-axis from Y=0 to Y=S(=YPRE). YPRE is a Y-coordinate corresponding to an upper end of the pre-scanning region. The CPU 4 then executes a right-edge detection process at S420. In the right-edge detection process, the CPU 4 detects a right-side edge of the document in the main scanning direction based on amounts of reflected light received by the scanning unit 15.

The right-edge detection process at S420 will be described next with reference to FIGS. 7 and 8.

Figure 7:
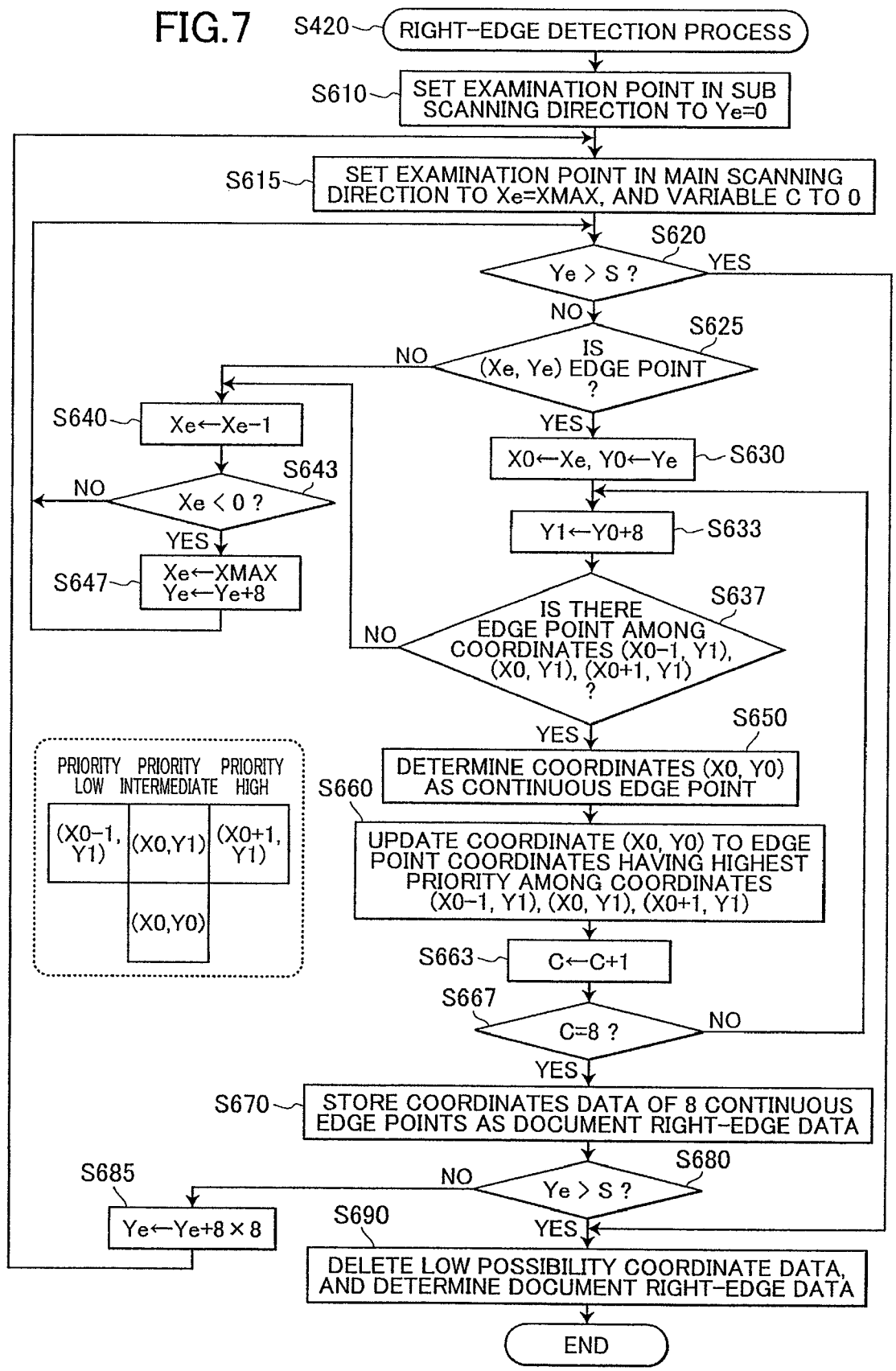
FIG. 7 is a flowchart showing a right-edge detection process.
Figure 8:
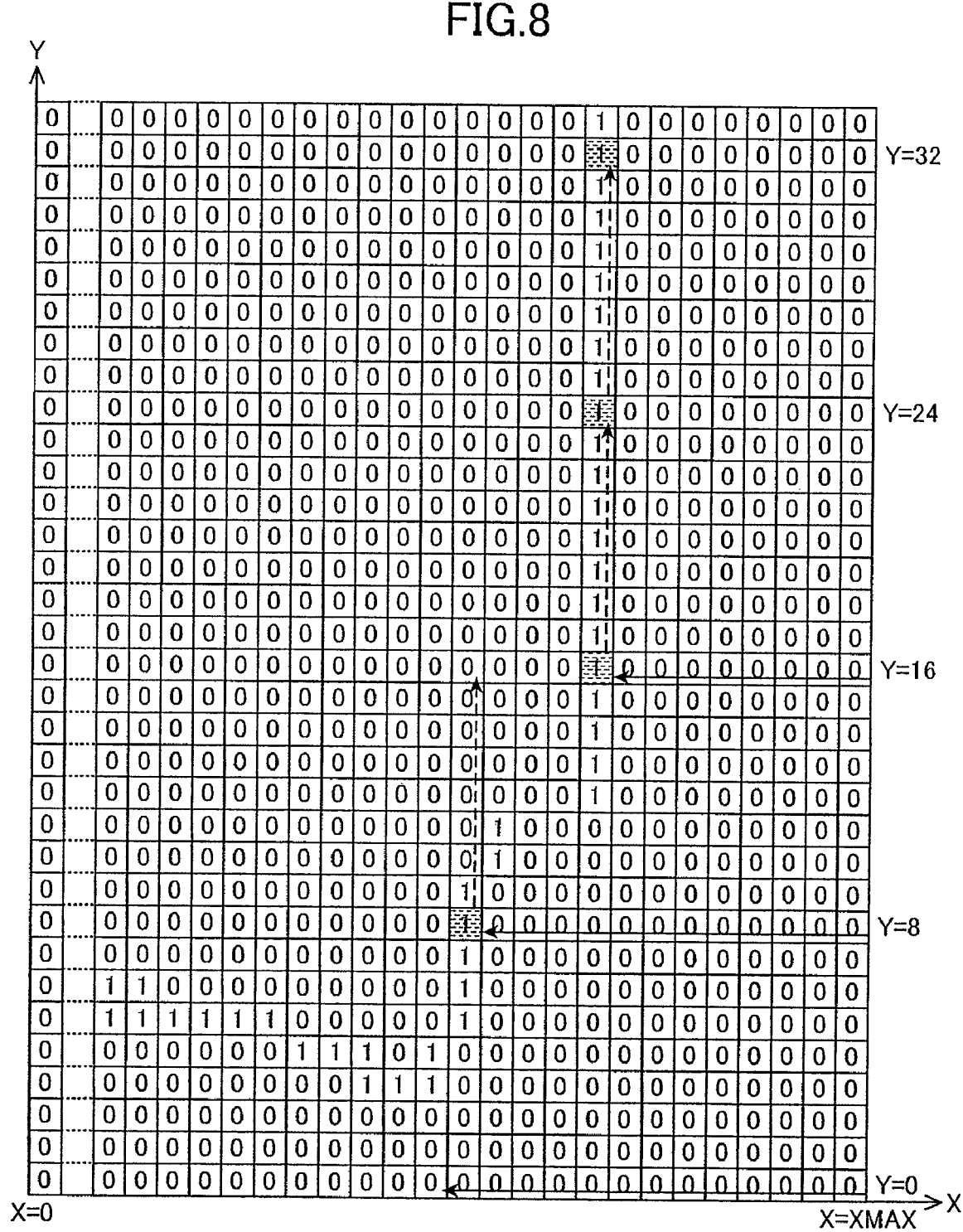
FIG. 8 is an explanatory view showing an excerpt of configuration of edge image data.

As shown in FIG. 7, the CPU 4 first sets a detection point in sub scanning direction Ye to a Y-coordinate of the lower-end of the scannable region R0 (Ye=0) at S610. The CPU 4 then sets a detection point in the main scanning direction Xe to an X-coordinate of the right end of the scannable region R0 (Xe=MAX) at S615. The CPU 4 also initializes a variable C indicating a determining number of an edge point to a value 0 at S615. Then at S620, the CPU 4 determines whether the detection point in the sub scanning direction Ye is out of the detection range, i.e., whether Ye is greater than or equals to S (Ye>S).

When determining that the detection point in the sub scanning direction Ye is within the detection range (S620: No), the CPU 4 then determines whether the detection point (Xe, Ye) is an edge point at S625 by referring to a pixel value of the data at the detection point (Xe, Ye). FIG. 8 shows trajectories of edge points tracked in the eight-edge detection process, wherein a pixel value "1" represents an edge point.

When the CPU 4 determines that the detection point (Xe, Ye) is not an edge point (S625: No), the CPU 4 updates the detection point (Xe, Ye) to a point moved in the X-axis direction by minus one pixel (Xe=Xe−1), and determines the updated detection point in the main scanning direction Xe is not beyond the left end of the scannable region R0 at S643. Specifically, the CPU 4 determines if an inequality Xe<0 is satisfied.

If the CPU 4 determines Xe is beyond the left end of the scannable region R0, i.e., the equality Xe<0 is satisfied (S643: Yes), the CPU 4 sets the detection point in the main scanning direction Xe to the right end of the scannable region R0 (Xe=XMAX) and updates the detection point in the sub scanning direction Ye to a value obtained by adding 8 to the current value (Ye=Ye+8). That is, here, the detection point in the sub scanning direction Ye is set to a position moved in the Y-axis direction from Ye by 8 pixels. The CPU 4 then returns to S620.

On the other hand, if determining that Xe is not beyond the left end of the scannable region R0 (S643: No), the CPU 4 directly returns to S620 and determines the detection point in the sub scanning direction Ye is now beyond the scannable region R0 (Ye>S). Upon determining Ye is still in the detection range in the Y-axis (S620: No), the CPU 4 proceeds to S625, while the CPU 4 advances to S690 if determining Ye is beyond the detection range (S620: Yes).

At S625, if determining the detection point (Xe, Ye) is an edge point (S625: Yes), the CPU 4 assigns the coordinate of the current detection point (Xe, Ye) to an edge point (X0, Y0) at S630. The CPU 4 then assigns a Y-coordinate moved in the Y-axis direction from Y0 by 8 pixels to Y1 at S633.

Subsequently, at S637, the CPU 4 determines whether at least any one of the following three points is an edge point: points (X0−1, Y1), (X0, Y1), and (X0+1, Y1). If none of the above three points is determined to be an edge point (S637: No), the CPU 4 moves to S640 whereby the detection point in the main scanning direction Xe is updated to a position moved in the X-axis direction by minus 1 pixel (Xe=Xe−1).

If the CPU 4 determines that at least one of the three points (X0−1, Y1), (X0, Y1), and (X0+1, Y1) is an edge point (S637: Yes), the CPU 4 deems the edge point (X0, Y0) to be a continuous edge point, and temporarily stores the edge point (X0, Y0) as coordinates data of continuous edge points at S650.

After the process at S650, if two or three points among the three points (X0−1, Y1), (X0, Y1), and (X0+1, Y1) is edge points, the CPU 4 selects one of the edge points as the edge point in accordance with a predetermined priority at S660.

In the present embodiment, the closer to the right end of the scannable region R0 the coordinates is, the higher priority the CPU 4 assigns. That is, the CPU 4 sets highest priority to the point at coordinates (X0+1, Y1), which is closest to the right end of the scannable region R0, intermediate priority to the point at coordinates (X0, Y1), and low priority to the point at coordinates (X0−1, Y1).

Priorities are assigned to each point as such because of the following reasons. No edge point should exist on the platen 11a in an area rightward from the right edge of the document. Hence, there is a high possibility that such an edge point closer to the right edge of the scannable region R0 is indeed an edge point corresponding to the right edge of the document.

At S660, the CPU 4 chooses one that is given the highest priority, from the two or three edge points. The CPU 4 then updates the edge point (X0, Y0) to the X-coordinate and the Y-coordinate of the selected point. The CPU 4 subsequently increments the value of the variable C by 1 at S663.

Upon completion of S663, the CPU then determines whether the updated value of the variable C is equal to 8 at S667. When determining that the variable C is not equal to 8 (S667: No), the CPU 4 returns to S633 and updates Y1 to a Y-coordinate moved from Y0 in the Y-axis direction by 8 pixels (Ye=Y0+8). The CPU 4 thereafter repeats the steps after S637. In this way, the CPU 4 examines whether an edge point is continuous every eight pixels in the Y-axis, as shown in FIG. 8.

When determining the variable C is 8 (S667:Yes), i.e., when eight points are stored as coordinates data of continuous edge points at S650, the CPU 4 stores each of the eight coordinates data in the RAM 6 as document right-edge data at S670.

The CPU 4 then proceeds to S680 whereby the CPU 4 determines whether the detection point in the sub scanning direction Ye is beyond the detection range, that is, if the inequality Ye>S. When Ye is determined to be within the detection range (S680: No), the CPU 4 updates Ye to a position moved in the sub scanning direction by 64 pixels at S685 (Ye=Ye+8×8) and returns to S615. In this way, the CPU 4 repeatedly detects eight continuous edge points as a group, as shown in FIG. 8.

When the detection point in the sub scanning direction Ye is beyond the detection range (S620: Yes, or S680: Yes), the CPU 4 determines the document right-edge data at S690 while deleting coordinates data indicating low possibility to be the right edge (edge points representing the right edge of the document), for example, coordinates data that is apart from the adjacent edge point stored in the RAM 6 by greater than or equal to a predetermined distance, from the coordinate data stored as the document right-edge data in S670.

Upon completing the right-edge detection process, the CPU 4 moves back to S430 of the document size determination process in FIG. 6. Here, the CPU 4 calculates an approximated straight-line made up of points representing the right-edge data determined through the right-edge detection process (hereinafter, referred to as "right-edge approximate straight line").

The CPU 4 then determines whether the right-edge approximate straight line has a slope greater than a predetermined angle relative to the Y-axis at S440. Specifically in the present embodiment, the CPU 4 determines if the right-edge approximate straight line is inclined with respect to the Y-axis by more than 0.5 degrees.

When determining that the slope of the right-edge approximate straight line is smaller than the predetermined angle (S440: No), the CPU 4 determines the slope of the right-edge approximate straight line to be 0 degree at S441. The CPU 4 therefore assumes the document is correctly placed on the platen 11a with the lower-left corner of the document aligned with the inner lower-left corner of the frame 13a. As a consequence, as illustrated in a figure enclosed by a dotted line in FIG. 6, the CPU 4 presumes an intersection of the right-edge approximate straight line and a lower end of the platen 11a (i.e., an inner side of a bottom portion of the frame 13a (will be referred to as "bottom frame")) to be a lower-right corner of the document in S442.

The CPU 4 then assumes the lower-left corner of the document to be at the lower-left corner of the platen 11a (i.e., inner lower-left corner of the frame 13a) and estimates the width dimension of the document at S443. With this configuration, width dimension of a document can be determined based on a position of right edge of the document detected through the right-edge detection process (S420).

The CPU 4 then determines the document size at S444 based on which of the numeral ranges stored in the document size determination table 5b the estimated width dimension can be categorized.

The CPU 4 next derives coordinates at which the upper-left corner and the upper-right corner of the document are located from the document size and the tilt angle θ. Hence, at S445, the CPU 4 defines four sides of a quadrangle formed by connecting the detected four corners as an outline of the document, and determines that a region bounded within the outline is the region at which the document is placed.

On the other hand, when the CPU 4 determines the slope of the right-edge approximate straight line is greater than the predetermined angle with respect to the Y-axis (S440: Yes), the CPU 4 then determines whether the slope of the right-edge approximate straight line is negative at S450. Specifically, assuming that the right-edge approximate straight line is expressed as an equation Y=A·X+B, the CPU 4 determines whether the slope A is smaller than zero. When the slope A is determined to be negative (S450: Yes), the CPU 4 presumes a point on the right-edge approximate straight line to be a lower-right corner of the document, the point corresponding to an edge point located lowermost and rightmost on the platen 11a among the edge points indicative of the right-edge data of the document, and calculates a coordinate value of the edge point at S452.

When the slope A of the right-edge approximate straight line is determined to be positive at S450 (S450: No), the CPU 4 estimates the lower-right corner of the document to be an intersection of the right-edge approximate straight line and the lower end portion of the platen 11a (inner side of the bottom frame), and calculates a coordinate value of the intersection at S460.

When the lower-right corner of the document is determined at either S452 or S460, the CPU 4 then determines a lower-left corner of the document to be an intersection of a straight line and the lower end portion of the platen 11a (inner side of the bottom frame), the straight line being perpendicular to the right-edge approximate straight line and passing the lower-right corner of the document, and calculates a coordinate value of the intersection at S454.

The CPU 4 then determines a tilt angle θ of the document at S456. Precisely, the tilt angle θ is determined to be an angle formed between the right-edge approximate straight line and the Y-axis. The CPU 4 then presumes width of the document to be a line segment connecting the lower-right corner (detected at S452 or S460) and the lower-left corner (detected at S445), and estimates the width dimension of the document at S458.

The CPU 4 then determines the document size at S444 based on the width dimension estimated at S458, and finally determines the area of the placed document at S445 from the information on the determined lower-left corner, lower-right corner, document size and the tilt angle θ of the document. The document size determination process is thus terminated upon completion of S445.

According to the document size determination process of the present embodiment, the document size is determined based on the width dimension of the document. When determining the document size to be either A4 size or letter size is difficult, the document size is presumed to be the virtual size (see FIG. 4B). That is, the MFP 1 can presume the document to be an appropriate document size capable of containing the document as a whole therein, regardless of whether the document is A4 size or letter size.

Having finished the document size determination process, the CPU 4 executes process after S330 of FIG. 5 as described earlier. In other words, the CPU 4 sets a magnifying ratio based on the determined document size (S340, S350), generates image data for printing by magnifying, reducing, or rotating the same in accordance with the determined magnifying ratio and the amount of correction (S380), and executes printing operations using the image data for printing (S390). Thus copied image of the document is printed on the recording sheets. According to the document size determination process of the present embodiment, the MFP 1 can determine the area of the placed document and the magnifying ratio based on suitably determined document size, thereby enabling the entire document to be copied at an appropriate magnifying ratio without any information being lost.

Although the present invention has been described with respect to a specific embodiment thereof, it will be appreciated by one skilled in the art that a variety of changes may be made without departing from the scope of the invention.

For example, in the document size determination table 5b of the above embodiment, each numeric range is given a fixed number, but the numeric range may be configured to change in accordance with surrounding circumstances.

As shown in FIG. 9A, a numeric range corresponding to the A4 size is broader in the document size determination table 5c than in the document size determination table 5b. More specifically, the numeric range for the A4 size in the document size determination table 5c is set to be greater than or equal to 153 mm but smaller than 213 mm, while the numeric range for the A4 size in the document size determination table 5b of the above described embodiment is designed to be greater than or equal to 153 mm but smaller than 212 mm. Hence, employing the document size determination table 5c may result in a determination that the A4 size tends to be selected as the document size.

On the contrary, a document size determination table 5d shown in FIG. 9B has a numeric range broader than the document size determination table 5b for the letter size. That is, the numeric range corresponding to the letter size is set to be greater than or equal to 213 mm but smaller than 220.9 mm in the document size determination table 5d, while the numeric range corresponding to the letter size in the document size determination table 5b is designed to be greater than or equal to 214 mm but smaller than 220.9 mm in the above described embodiment. Hence, employing the document size determination table 5d may lead to a determination that the letter size tends to be selected as the document size.

The ROM 5 may be configured to store all the document size determination tables 5b, 5c and 5d. In this case, the MFP 1 may be configured such that the MFP 1 can switch from one to another document size determination table depending on the circumstances. With this configuration, the MFP 1 can change a tendency relating to document size determination.

For example, the ROM 5 may store nationality information indicating countries where the MFP 1 can be used. In this case, the MFP 1 may be configured to select one table from the document size determination tables 5b, 5c and 5d based on the nationality information, and to use the selected table.

More specifically, the MFP 1 may be configured to choose one from the document determination table 5b, 5c and 5d so that a most popular standard size in a country where the MFP 1 is used can be selected as the document size. In the United Stats or Canada, for instance, the letter size is more often used than in other countries as a standard size recording sheet.

With this configuration, at least one of the numeric ranges corresponding to the A4 size and letter size can be made broader or narrower in accordance with the nationality information. Hence, the tendency in the document size determination can also be changed as such. For example, if the nationality information shows the A4 size is mainly used in a country, the MFP 1 may choose to use the document size determination table 5c so that the A4 size can be frequently selected as a document size.

Further, the MFP 1 may be configured to store a printing history of the printer 3 (see FIG. 2A). Specially, the MFP 1 may store number of times recoding sheets of every standard size are printed on the printer 3, and subsequently select a suitable table among the document size determination table 5b, 5c and 5d based on the number of times recording sheets of every standard size are printed on the printer 3. When the A4 size is mainly used in the printer 3, for example, the MFP 1 may select the document size determination table 5c so that the numeric range of the A4 size can be enlarged.

Alternatively, the MFP 1 may be configured to store scanning history of the scanner 2b. Specifically, the MFP 1 may store relationships between each standard size and numbers of times documents of every standard size are scanned, and adjust at least one of the numeric ranges corresponding to the A4 size and the letter size to be widened or shrunk based on the counted numbers of times.

More specifically, for example, in the document size determination process in FIG. 6, the CPU 4 refers to the scanning history before determining the document size at S444, and compares how many times A4 size documents are scanned and how many times letter size documents are scanned. If the number of times A4 size documents are scanned is greater than the number of times letter size documents are scanned, the MFP 1 may employ the document size determination table 5c so that the numeric range corresponding to the A4 size can be made broader and that the MFP 1 can thus have a tendency to determine the A4 size as a document size. If the number of times letter size documents are scanned is greater than the number of times A4 size documents are scanned, on the other hand, the MFP 1 may adopt the document size determination table 5d and change the numeric range corresponding to the letter size. If numbers of times A4 size documents and letter size document are scanned are approximately identical to each other, the MFP 1 may be configured to use the document size determination table 5b.

Note that, in the above-described embodiment, each document is assumed to be placed on the platen 11a in portrait orientation, but the present invention can also be applied to a case where a document is placed in landscape orientation. In this case, a document is placed on the platen 11a such that a long side of the document is aligned with the main scanning direction. Therefore, dimensions of the long sides of the document and the standard size correspond to "width dimension", while dimensions of the short sides correspond to the "length dimension". As in this case, if documents are possibly placed on the platen 11a both in portrait and landscape orientations, the MFP 1 may store in the ROM 5 a document size determination table designed for landscape orientation, in addition to the document size determination table 5b. In such a document size determination table for landscape orientation, numeric ranges including dimensions of long sides for each standard size document are stored in association with corresponding standard sizes respectively.

In the above embodiment, the present invention is applied to a case where documents placed on the platen 11a are scanned. However, the present invention can be applied to a case where documents are scanned while being conveyed by an automatic document feeder (ADF).

Further, the documents size determination table 5b of the present embodiment includes only one virtual size, but may instead include a plurality of virtual sizes each having width dimension and length dimension different from each other.

Alternatively, the above-described virtual size is designed to include both the A4 size and the letter size therein, but may be configured such that more than three kinds of standard sizes can be applied thereto. In this case, width dimension of the virtual size is determined to be that of one standard size greater than the estimated width dimension of the target document, and length dimension is determined to be that of another standard size greater than the length dimension of the standard size selected as the width dimension. Further, only width dimension of the virtual size may be determined to be that of one standard size greater than the estimated width dimension of the target document.

What is claimed is:

1. An image scanning device comprising:
   a board having a surface on which a document having a rectangular shape is puttable, the surface having an X-axis extending in an X-direction and a Y-axis extending in a Y-direction orthogonal to the X-direction, the document including a standard document having a plurality of standard sizes different from one another and each defined by a horizontal edge and a longitudinal edge orthogonal to the horizontal edge;
   a receiving unit that receives a light reflected on the document putted on the surface;
   a presuming unit configured to presume a dimension of the horizontal edge of the document putted on the surface, based on the reflected light;
   a determining unit configured to determine, based on the presumed dimension, whether or not the document putted on the surface has one of the plurality of standard sizes;
   an assuming unit configured to assume that the document putted on the surface has a virtual size defined by a virtual horizontal edge and a virtual longitudinal edge orthogonal to the virtual horizontal edge if the determining unit determines that the document putted on the surface has neither the plurality of standard sizes, the virtual horizontal edge having a virtual horizontal dimension equal to or larger than the presumed dimension if the horizontal edge and the virtual horizontal edge extend in the X-direction, the virtual longitudinal edge having a virtual longitudinal dimension; and
   a scanning unit that scans the document over a range corresponding to the virtual size to generate image data, if the assuming unit assumes that the document putted on the surface has the virtual size.

2. The image scanning device according to claim 1, wherein the plurality of standard sizes includes a first standard size defined by a first horizontal edge having and a first longitudinal edge orthogonal to the first horizontal edge and a second standard size defined by a second horizontal edge and a second longitudinal edge orthogonal to the second horizontal edge, the first horizontal edge having a first horizontal dimension, the first longitudinal edge having a first longitudinal dimension, the second horizontal edge having a second horizontal dimension, the second longitudinal edge having a second longitudinal dimension, and wherein the virtual horizontal dimension is equal to the first horizontal dimension and the virtual longitudinal dimension is equal to the second longitudinal dimension, the second longitudinal dimension being larger than the first longitudinal dimension, if the first horizontal edge, the second horizontal edge, and the virtual horizontal edge extend in the X-direction and the first longitudinal edge, the second longitudinal edge, and the virtual longitudinal edge extend in the Y-direction.

3. The image scanning device according to claim 2, wherein the first horizontal dimension is larger than the second horizontal dimension, if the first horizontal edge, the second horizontal edge, and the virtual horizontal edge extend in the X-direction and the first longitudinal edge, the second longitudinal edge, and the virtual longitudinal edge extend in the Y-direction.

4. The image scanning device according to claim 1, wherein the plurality of standard sizes includes a first standard size defined by a first horizontal edge having and a first longitudinal edge orthogonal to the first horizontal edge and a second standard size defined by a second horizontal edge and a second longitudinal edge orthogonal to the second horizontal edge, the first horizontal edge having a first horizontal dimension that is larger than the presumed dimension and the closest to the presumed dimension among a plurality of dimensions of the plurality of standard sizes, the second horizontal edge having a second horizontal dimension that is larger than the presumed dimension and the second closest to the presumed dimension among a plurality of dimensions of a plurality of horizontal edges of the plurality of standard sizes, and wherein the virtual horizontal dimension is larger than the first horizontal dimension and smaller than the second horizontal dimension.

5. The image scanning device according to claim 4, wherein the first longitudinal edge has a first longitudinal dimension, and the second longitudinal edge has a second longitudinal dimension that is larger than the first longitudinal dimension and the second closest to the first longitudinal dimension among a plurality of dimensions of the plurality of longitudinal edges of the plurality of standard sizes, and wherein the virtual horizontal dimension is larger than the second longitudinal dimension and smaller than the first longitudinal dimension.

6. The image scanning device according to claim 1, further comprising a range storing unit that stores a first range between a first minimum value and a first max value and a second range between a second minimum value and a second max value, the first horizontal dimension falling into the first range, the second horizontal dimension falling into the second range, the first minimum value being larger than the second max value, and wherein the assuming unit assumes that the document has the first standard size if the presumed dimension falls into the first range, assumes that the document has the second standard size if the presumed horizontal dimension falls into the second range, and assumes that the first document has the virtual size if the presumed first horizontal dimension is smaller than the first minimum value and greater than the second max value.

7. The image scanning device according to claim 6, further comprising a range changing unit configured to change at least one of the first minimum value, the first max value, the second minimum value, and the second max value.

8. The image scanning device according to claim 7, further comprising a nationality information storing unit that stores nationality information with respect to a national in which the image scanning device is used, wherein the range changing unit changes at least one of the first range and the second range based on the nationality information.

9. The image scanning device according to claim 7, further comprising:

a printing unit that prints an image on a recording sheet based on the image data generated by the scanning unit; and a size information acquiring unit configured to acquire size information with respect to a size of the recording sheet, wherein the range changing unit changes at least one of the first range and the second range based on the size information.

10. The image scanning device according to claim 7, further comprising a number of times storing unit that stores a number of times the scanning unit has generated image data corresponding to the standard document for each size of the standard document, wherein the range changing unit changes at least one of the first range and the second range based on the number of times.

11. A computer-readable storage medium storing a set of program instructions executable on an image scanning device including a board having a surface on which a document having a rectangular shape is puttable, the surface having an X-axis extending in an X-direction and a Y-axis extending in a Y-direction orthogonal to the X-direction, the document including a standard document having a plurality of standard sizes different from one another and each defined by a horizontal edge and a longitudinal edge orthogonal to the horizontal edge; a receiving unit that receives a light reflected on the document putted on the surface; and a scanning unit that scans the document to generate image data, the program instructions comprising:

presuming a dimension of the horizontal edge of the document putted on the surface, based on the reflected light;

determining, based on the presumed dimension, whether or not the document putted on the surface has one of the plurality of standard sizes;

assuming that the document putted on the surface has a virtual size defined by a virtual horizontal edge and a virtual longitudinal edge orthogonal to the virtual horizontal edge if the determining unit determines that the document putted on the surface has neither the plurality of standard sizes, the virtual horizontal edge having a virtual horizontal dimension equal to or larger than the presumed dimension if the horizontal edge and the virtual horizontal edge extend in the X-direction, the virtual longitudinal edge having a virtual longitudinal dimension; and controlling the scanning unit to scan the document over a range corresponding to the virtual size, if the assuming unit assumes that the document putted on the surface has the virtual size.

* * * * *